US012719193B2

(12) United States Patent
Hashiguchi

(10) Patent No.: US 12,719,193 B2

(45) Date of Patent: Aug. 25, 2026

(54) CONNECTOR THAT IS MOUNTED ON MOUNTING OBJECT OF SHEET TYPE HAVING PLURALITY OF FLEXIBLE CONDUCTORS AND THAT IS TO BE FITTED WITH COUNTER CONNECTOR IN FITTING DIRECTION

(71) Applicant: Japan Aviation Electronics Industry, Limited, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 248 days.

(21) Appl. No.: 18/543,429

(22) Filed: Dec. 18, 2023

(65) Prior Publication Data

US 2024/0250461 A1 Jul. 25, 2024

(30) Foreign Application Priority Data

Jan. 19, 2023 (JP) ................................ 2023-006477

(51) Int. Cl.

| | |
|---|---|
| ***H01R 13/502*** | (2006.01) |
| ***H01R 12/77*** | (2011.01) |
| ***H01R 13/52*** | (2006.01) |

(52) U.S. Cl.

CPC ......... *H01R 12/778* (2013.01); *H01R 13/502* (2013.01); *H01R 13/5205* (2013.01)

(58) Field of Classification Search

None

See application file for complete search history.

(56) References Cited

U.S. PATENT DOCUMENTS

| | | | | |
|---|---|---|---|---|
| 4,959,030 | A * | 9/1990 | Tatebe | H01R 13/56 439/493 |
| 10,581,189 | B2 * | 3/2020 | Qiao | H01R 12/75 |
| 10,923,855 | B2 | 2/2021 | Matsuo | |
| 2020/0052441 | A1 | 2/2020 | Matsuo | |

FOREIGN PATENT DOCUMENTS

| | | | |
|---|---|---|---|
| CN | 114520427 | A | 5/2022 |
| CN | 115117666 | A | 9/2022 |
| EP | 4000436 | A1 | 5/2022 |
| EP | 4060818 | A1 | 9/2022 |
| JP | 2019087515 | A | 6/2019 |
| JP | 2020-24846 | A | 2/2020 |
| JP | 2020024846 | A | 2/2020 |
| JP | 2021-061158 | A | 4/2021 |

* cited by examiner

*Primary Examiner* — Tho D Ta

(74) *Attorney, Agent, or Firm* — MUNCY, GEISSLER, OLDS & LOWE, P.C.

(57) ABSTRACT

A connector includes a bendable housing and contacts retained in the housing with arranged in an arrangement direction orthogonal to a fitting direction, the housing having first projections arranged in the arrangement direction to correspond to the contacts and projecting in the fitting direction, each of the contacts having a contact portion retained in a corresponding one of the first projections and configured to make contact with a corresponding counter contact of a counter connector, a connection portion connected to a corresponding one of flexible conductors of a mounting object, and a joint portion joining the contact portion and the connection portion to each other, the plurality of first projections being separate from one another.

11 Claims, 14 Drawing Sheets

CONNECTOR THAT IS MOUNTED ON MOUNTING OBJECT OF SHEET TYPE HAVING PLURALITY OF FLEXIBLE CONDUCTORS AND THAT IS TO BE FITTED WITH COUNTER CONNECTOR IN FITTING DIRECTION

BACKGROUND OF THE INVENTION

The present invention relates to a connector, particularly to a connector that is mounted on a mounting object such as a garment.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a flexible conductor drawn from the electrode.

As a connector of this type, for example, JP 2019-87515 A discloses a connector 1 as shown in FIG. 30. The connector 1 includes a connector body 2 made of an insulating material. The connector body 2 is provided with a counter connector accommodating portion 3 of recess shape, and two protrusion portions 4 are formed in the counter connector accommodating portion 3 to protrude from the bottom surface of the counter connector accommodating portion 3. The two protrusion portions 4 are separately elongated along opposite lateral edges of the counter connector accommodating portion 3, and a plurality of contacts 5 are retained in and exposed from the protrusion portions 4.

The connector body 2 is mounted on a sheet type mounting object 6, and a plurality of flexible conductors formed on the bottom surface of the mounting object 6 are electrically connected to the plurality of contacts 5.

When a counter connector is fitted to the connector 1, part of the counter connector is accommodated in the counter connector accommodating portion 3, and the plurality of contacts 5 exposed on the surfaces of the two protrusion portions 4 make contact with and are electrically connected to a plurality of counter contacts of the counter connector.

The protrusion portions 4 that retain the contacts 5 each have a predetermined width and a predetermined projection height in order to ensure the reliability of electrical connection between the contacts 5 and the counter contacts of the counter connector.

This makes it possible to transmit biological data to a measurement module incorporated in the counter connector or to a measurement module remote from the counter connector to thereby perform measurement or the like.

When the connector 1 as above is attached to a garment as a garment-side connector, and the connector body 2 is made of an insulating material that is low in flexibility, a user who wears the garment may feel discomfort due to the presence of the connector 1, and wear comfort may be reduced. In order to prevent reduction in wear comfort, the connector body 2 is desired to be made of an insulating material that is rich in flexibility.

However, since the counter connector accommodating portion 3 of the connector body 2 is provided with the protrusion portions 4 each of which has the predetermined width and the predetermined projection height, is elongated, and retains the plurality of contacts 5, even when the connector body 2 is made of an insulating material that is rich in flexibility, the connector 1 is hardly bent in a direction in which the protrusion portions 4 extend, so that it is difficult to obtain good wear comfort.

SUMMARY OF THE INVENTION

The present invention has been made in order to solve the conventional problems described above and aims at providing a connector capable of preventing deterioration in wear comfort even when the connector is mounted on a mounting object such as a garment.

A connector according to the present invention is one that is mounted on a mounting object of sheet type having a plurality of flexible conductors exposed on a surface of the mounting object and that is to be fitted with a counter connector in a fitting direction, the connector comprising:

a housing that is made of an insulating material and is bendable; and a plurality of contacts retained in the housing with arranged in an arrangement direction orthogonal to the fitting direction, each of the plurality of contacts being made of a conductive material, wherein the housing includes a plurality of first projections arranged in the arrangement direction to correspond to the plurality of contacts and projecting in the fitting direction, each of the plurality of contacts includes a contact portion retained in a corresponding one of the plurality of first projections and configured to make contact with a corresponding counter contact of the counter connector, a connection portion connected to a corresponding one of the plurality of flexible conductors of the mounting object, and a joint portion that joins the contact portion and the connection portion to each other, and the plurality of first projections are separate from one another.

DETAILED DESCRIPTION OF THE INVENTION

Embodiments of the present invention are described below based on the accompanying drawings.

Embodiment 1

Figure 1:
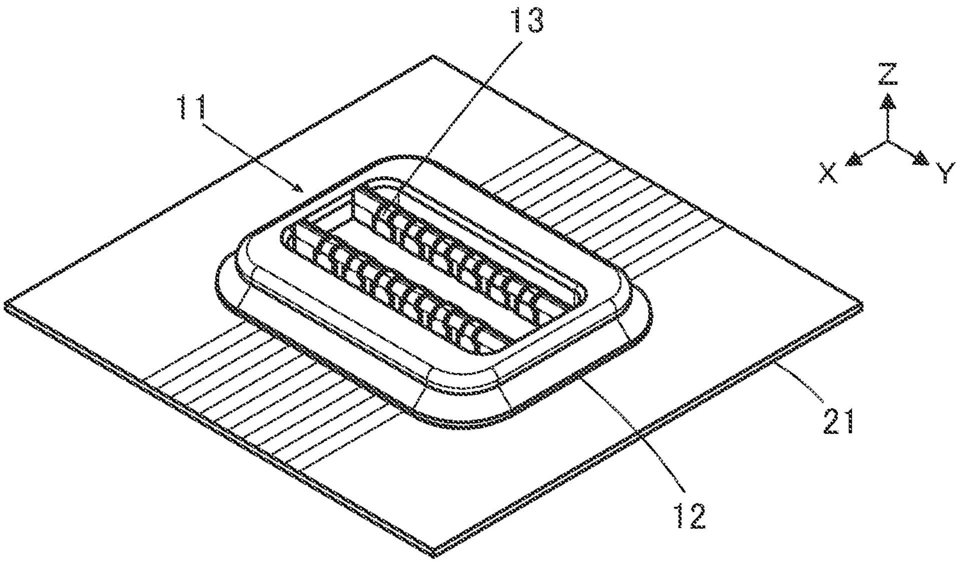
FIG. 1 is a perspective view showing a connector according to Embodiment 1 mounted on a mounting object.

FIG. 1 shows a connector 11 according to Embodiment 1. The connector 11 is used as, for example, a garment-side connector for fitting a wearable device and has a housing 12 attached to a sheet type conductive member 21, and a plurality of contacts 13 are retained in the housing 12. The sheet type conductive member 21 is composed of part of a garment and constitutes a sheet type mounting object on which the connector 11 is mounted.

The contacts 13 are arranged in two rows parallel to each other and disposed in the housing 12 to project perpendicularly to the sheet type conductive member 21.

For convenience, the sheet type conductive member 21 is defined as extending in an XY plane, the arrangement direction of the contacts 13 is referred to as "Y direction," and the direction in which the contacts 13 project is referred to as "+Z direction." The Z direction is a fitting direction in which the connector 11 is fitted to a counter connector.

Figure 2:
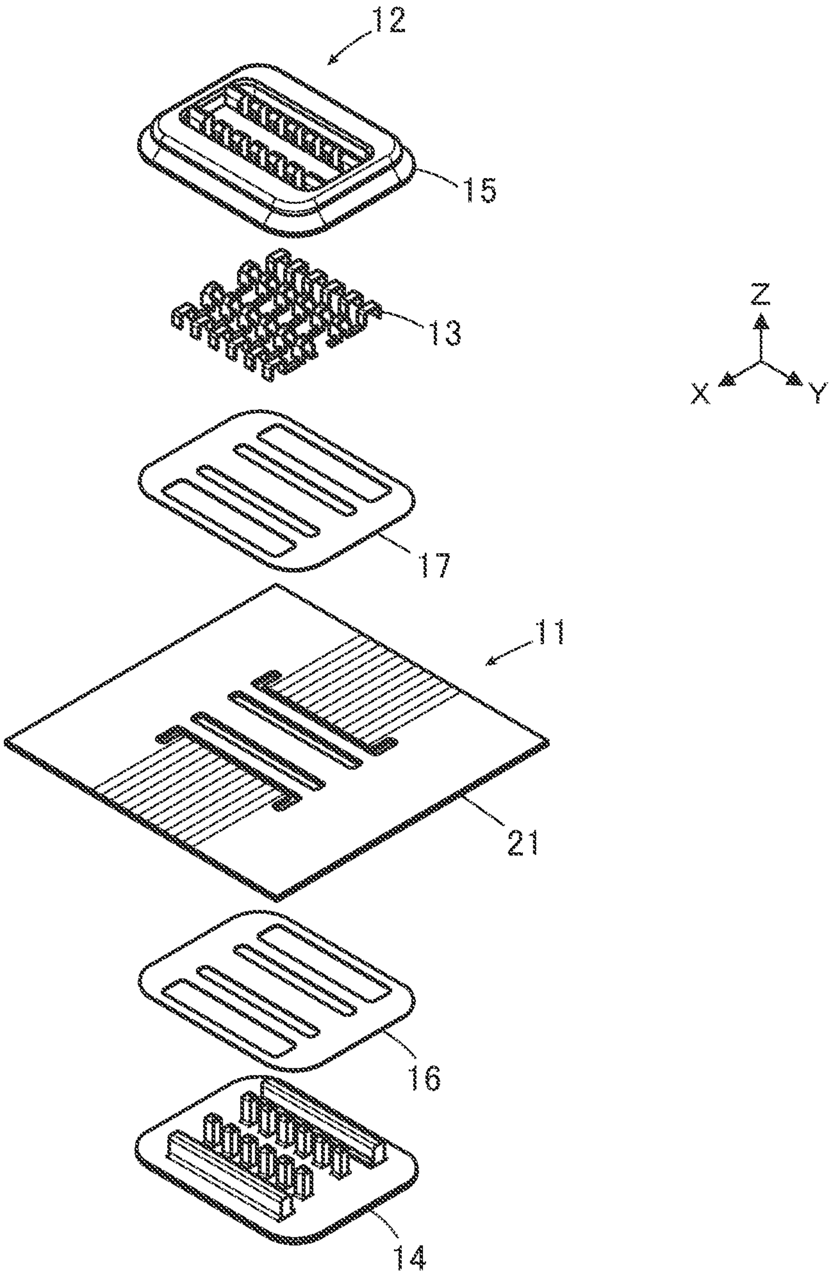
FIG. 2 is an assembly view of the connector according to Embodiment 1.

FIG. 2 shows an assembly view of the connector 11. The connector 11 includes a first insulator 14 and a second insulator 15, and these first and second insulators 14 and 15 constitute the housing 12.

A first adhesive sheet 16 is disposed on the +Z direction side of the first insulator 14, and the sheet type conductive member 21 is disposed on the +Z direction side of the first adhesive sheet 16. Further, a second adhesive sheet 17 is disposed on the +Z direction side of the sheet type conductive member 21, the contacts 13 are disposed on the +Z direction side of the second adhesive sheet 17, and the second insulator 15 is disposed on the +Z direction side of the contacts 13.

Figure 3:
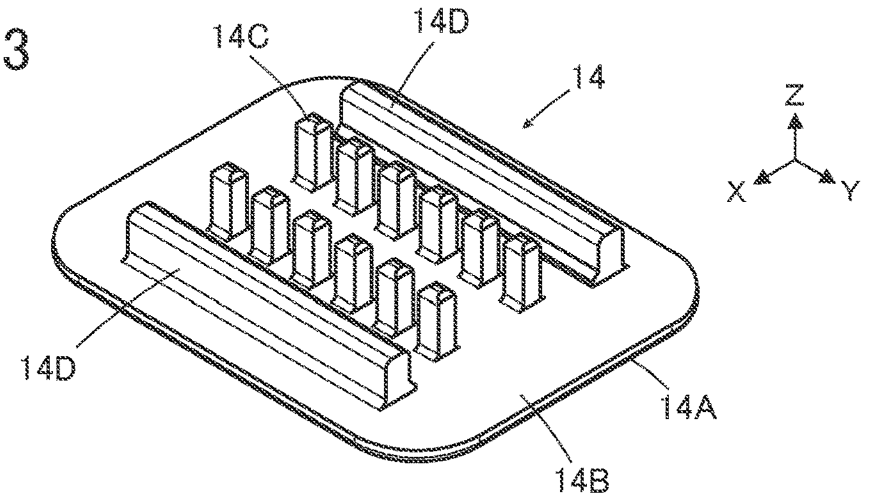
FIG. 3 is a perspective view showing a first insulator used in the connector of Embodiment 1.

The first insulator 14 is an elastically deformable member made of an insulating material and includes a flat plate portion 14A of substantially rectangular shape extending along an XY plane as shown in FIG. 3, and a +Z directional surface of the flat plate portion 14A forms a first opposed surface 14B facing the bottom surface of the sheet type conductive member 21.

The first insulator 14 includes a plurality of first projections 14C projecting in the +Z direction from the first opposed surface 14B. The first projections 14C are arranged in two rows extending in the Y direction and spaced apart from each other in the X direction.

Further, the first insulator 14 includes two second projections 14D separately on the +X direction side and the −X direction side of the two rows of the plurality of first projections 14C. The two second projections 14D project in the +Z direction from the first opposed surface 14B and extend in the Y direction.

The plurality of first projections 14C each have a projection height higher in the Z direction than that of each of the two second projections 14D.

Figure 4:
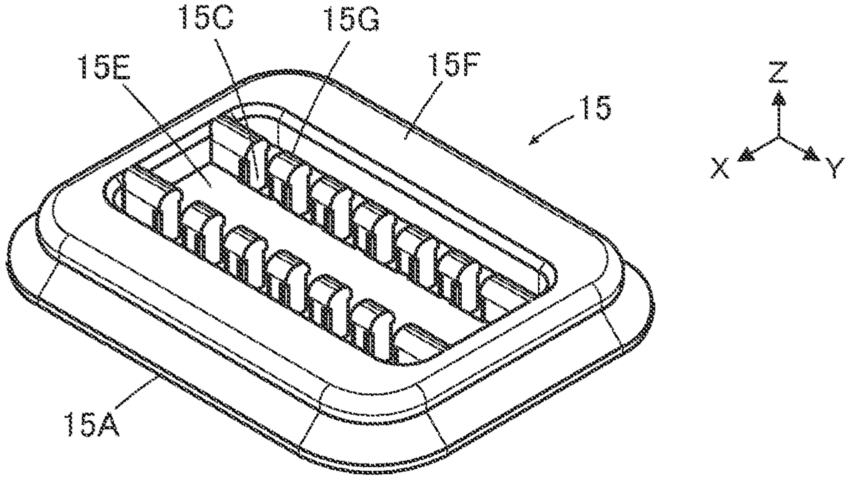
FIG. 4 is a perspective view of a second insulator used in the connector of Embodiment 1 when viewed from an obliquely upper position.
Figure 5:
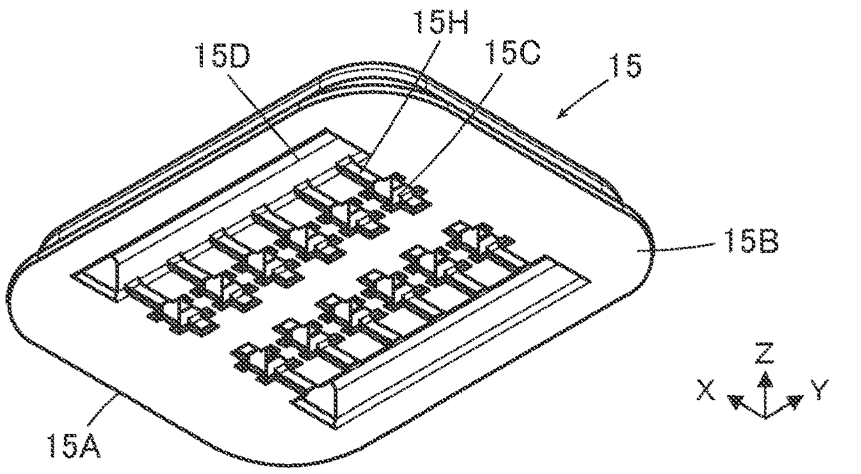
FIG. 5 is a perspective view of the second insulator used in the connector of Embodiment 1 when viewed from an obliquely lower position.

As with the first insulator 14, the second insulator 15 is also an elastically deformable member made of an insulating material. As shown in FIGS. 4 and 5, the second insulator 15 includes a flat plate portion 15A of substantially rectangular shape extending along an XY plane, and the bottom surface on the −Z direction side of the flat plate portion 15A forms a second opposed surface 15B facing the top surface of the sheet type conductive member 21.

The second insulator 15 includes a plurality of through-holes 15C corresponding to the plurality of first projections 14C of the first insulator 14 and penetrating the flat plate portion 15A in the Z direction, and two recessed portions 15D corresponding to the two second projections 14D of the first insulator 14 and recessed in the +Z direction from the second opposed surface 15B.

The through-holes 15C are arranged in two rows extending in the Y direction as with the first projections 14C of the first insulator 14, and the two recessed portions 15D are disposed separately on the opposite sides in the X direction of the two rows of the plurality of through-holes 15C and extend in the Y direction.

As shown in FIG. 4, a counter connector accommodating portion 15E of recess shape opening toward the +Z direction is formed in the center of the flat plate portion 15A, and a protrusion portion 15F projecting in the +Z direction extends along a circumference of the flat plate portion 15A so as to surround the counter connector accommodating portion 15E. The two rows of the plurality of through-holes 15C are disposed in the counter connector accommodating portion 15E, and the two recessed portions 15D are formed inside the protrusion portion 15F.

The counter connector accommodating portion 15E is provided with a plurality of projections 15G each projecting in the +Z direction between the through-holes 15C adjacent to each other in the Y direction.

Further, as shown in FIG. 5, the second opposed surface 15B is provided with a plurality of grooves 15H that allow each row of the plurality of through-holes 15C and the corresponding recessed portion 15D in the vicinity of each row of the plurality of through-holes 15C to communicate with each other. Each groove 15H extends in the X direction.

Figure 6:
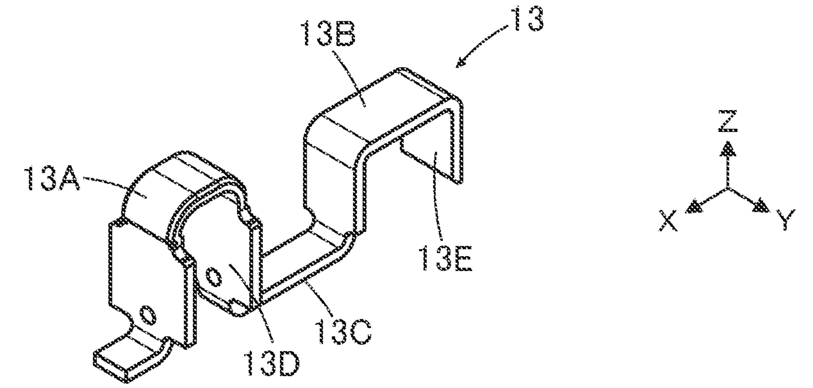
FIG. 6 is a perspective view showing a contact used in the connector of Embodiment 1.

As shown in FIG. 6, the contact 13 is constituted of a band-shaped member made of a conductive material such as metal, and includes a contact portion 13A and a connection portion 13B that are disposed with a distance therebetween in the X direction, and a joint portion 13C that joins these contact portion 13A and connection portion 13B to each other.

The contact portion 13A is to make contact with a counter contact of a counter connector, is formed by bending a portion of the contact 13 in a U shape to have a projection shape projecting in the +Z direction, and is provided in its inside with a first projection accommodating portion 13D of recess shape opening toward the −Z direction.

The connection portion 13B is to be connected to a flexible conductor of the sheet type conductive member 21, is formed by bending a portion of the contact 13 bent in a U shape to have a projection shape projecting in the +Z direction, and is provided in its inside with a second projection accommodating portion 13E of recess shape opening toward the −Z direction as with the contact portion 13A.

The joint portion 13C extends along an XY plane.

Figure 7:
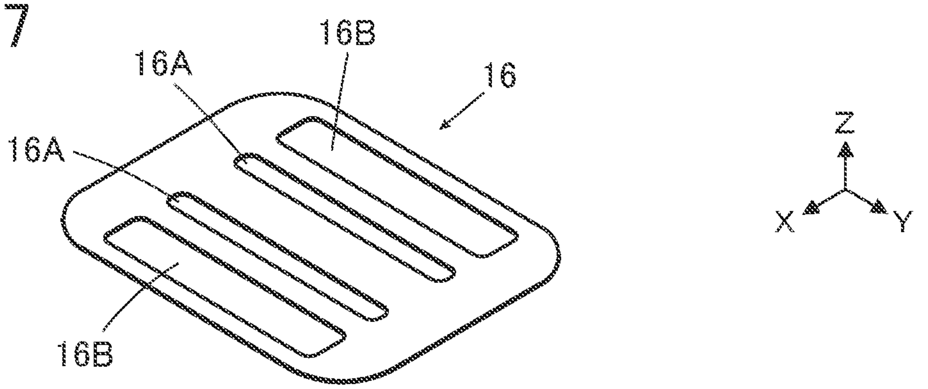
FIG. 7 is a perspective view showing a first adhesive sheet used in the connector of Embodiment 1.

As shown in FIG. 7, the first adhesive sheet 16 has a rectangular outer shape corresponding to the flat plate portion 14A of the first insulator 14 and includes two opening portions 16A that allow the plurality of first projections 14C arranged in two rows to pass therethrough and two opening portions 16B that allow the two second projections 14D to pass therethrough. The opening portions 16B are disposed separately on the +X direction side and the −X direction side of the two opening portions 16A.

The plurality of first projections 14C arranged in two rows are passed through the two opening portions 16A, and the two second projections 14D are passed through the two opening portions 16B, whereby the first adhesive sheet 16 can be brought into contact with the first opposed surface 14B of the first insulator 14.

Figure 8:
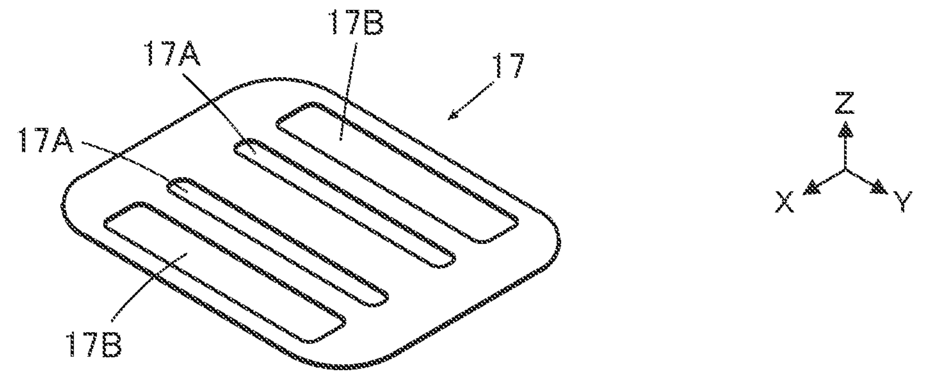
FIG. 8 is a perspective view showing a second adhesive sheet used in the connector of Embodiment 1.

As shown in FIG. 8, the second adhesive sheet 17 has a rectangular outer shape corresponding to the flat plate portion 15A of the second insulator 15 and includes two opening portions 17A corresponding to the plurality of through-holes 15C arranged in two rows and two opening portions 17B corresponding to the two recessed portions 15D. The opening portions 17B are disposed separately on the +X direction side and the −X direction side of the two opening portions 17A.

The two opening portions 17A and the plurality of through-holes 15C arranged in two rows are aligned with each other, and the two opening portions 17B and the two recessed portions 15D are aligned with each other; in this state, the second adhesive sheet 17 can be brought into contact with the second opposed surface 15B of the second insulator 15.

As the first adhesive sheet 16 and the second adhesive sheet 17, for example, thermosetting adhesive sheets can be used, and when these sheets are heated, the bottom surface of the sheet type conductive member 21 can be adhered to the first opposed surface 14B of the first insulator 14, and the top surface of the sheet type conductive member 21 can be adhered to the second opposed surface 15B of the second insulator 15.

Figure 9:
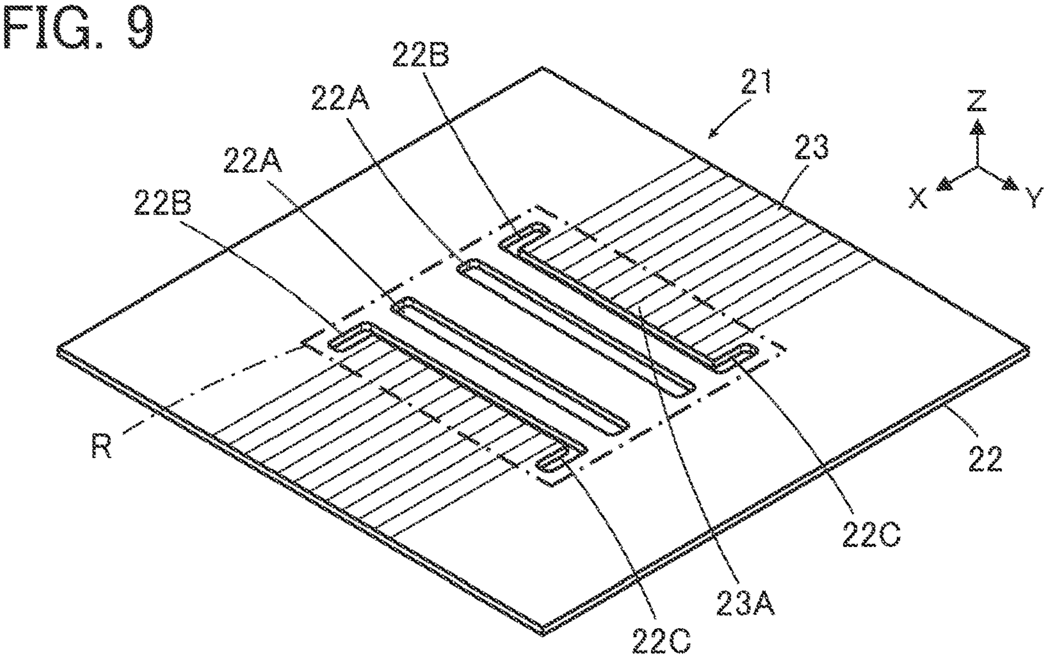
FIG. 9 is a perspective view showing a sheet type conductive member on which the connector of Embodiment 1 is to be mounted.

FIG. 9 shows the configuration of the sheet type conductive member 21. The sheet type conductive member 21 includes an insulating sheet body 22 and a plurality of flexible conductors 23 retained in the sheet body 22 and exposed at least on the top surface of the sheet body 22. As the sheet body 22, for example, cloth or knitted fabric of a garment can be used, and the flexible conductor 23 can be formed by embroidering the sheet body 22 with embroidery threads constituted of a conductive yarn.

A mounting region R on which the connector 11 is to be mounted is defined on the sheet body 22, and two opening portions 22A that allow the plurality of first projections 14C, arranged in two rows, of the first insulator 14 to pass therethrough and two opening portions 22B that allow the two second projections 14D of the first insulator 14 to pass therethrough are formed in the mounting region R. The opening portions 22B are disposed separately on the +X direction side and the −X direction side of the two opening portions 22A. Each opening portion 22B has a U shape opening toward a direction away from the corresponding opening portion 22A, and, accordingly, is provided in its inside with a protrusion piece 22C constituted of part of the sheet body 22 and protruding toward the corresponding opening portion 22A.

The sheet type conductive member 21 includes a plurality of flexible conductors 23 disposed on the +X direction side of the mounting region R and a plurality of flexible conductors 23 disposed on the −X direction side of the mounting region R. Each flexible conductor 23 includes a connection end portion 23A extending in the X direction from the outside of the mounting region R and disposed on the corresponding protrusion piece 22C in the mounting region R.

Figure 10:
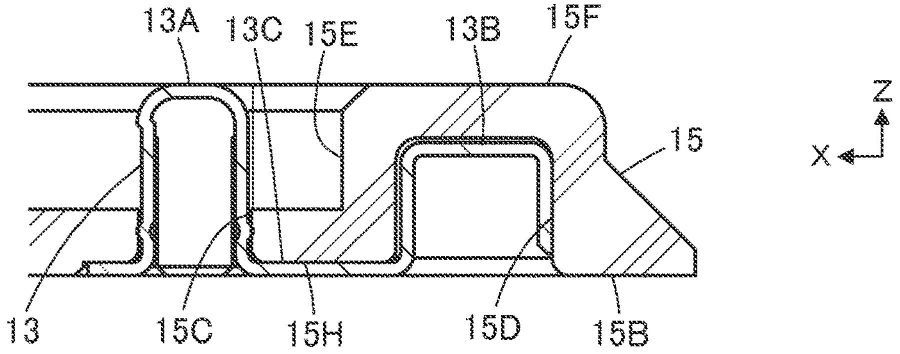
FIG. 10 is a partial cross-sectional view showing the second insulator in which the contact is retained in Embodiment 1.

In the process of assembling the connector 11, first, the contact 13 is pushed into the second insulator 15 from the −Z direction, whereby the contact 13 is retained in the second insulator 15 as shown in FIG. 10. At this time, the contact portion 13A of the contact 13 is passed through the corresponding through-hole 15C of the second insulator 15 and projects in the +Z direction in the counter connector accommodating portion 15E. In addition, the connection portion 13B of the contact 13 is inserted into the corresponding recessed portion 15D of the second insulator 15, and the joint portion 13C of the contact 13 is inserted into the corresponding groove 15H of the second insulator 15.

Figure 11:
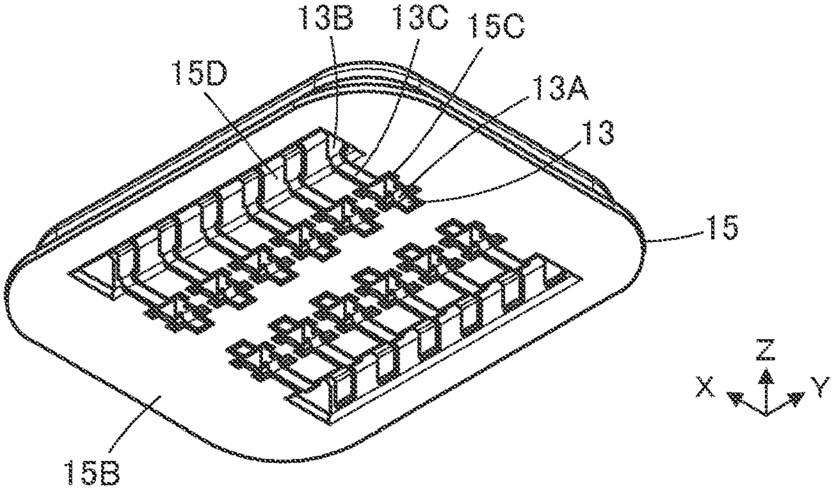
FIG. 11 is a perspective view of the second insulator in which a plurality of contacts are retained in Embodiment 1 when viewed from an obliquely lower position.

Similarly, as shown in FIG. 11, the plurality of contacts 13 are retained in the second insulator 15.

Figure 12:
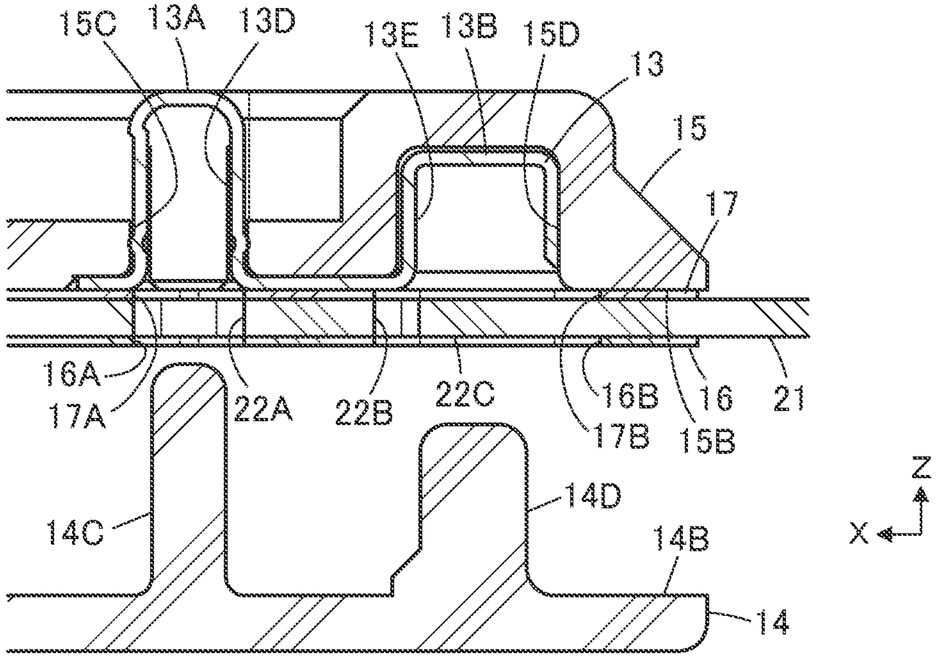
FIG. 12 is a partial cross-sectional view showing the first insulator and the second insulator in the process of assembling in Embodiment 1.

Next, as shown in FIG. 12, the second adhesive sheet 17, the sheet type conductive member 21, and the first adhesive sheet 16 are sequentially superposed and disposed on the second opposed surface 15B, facing in the −Z direction, of the second insulator 15.

The second adhesive sheet 17, the sheet type conductive member 21, and the first adhesive sheet 16 are positioned with respect to the second insulator 15 such that the opening portions 17A of the second adhesive sheet 17, the opening portions 22A of the sheet type conductive member 21, and the opening portions 16A of the first adhesive sheet 16 are situated on the −Z direction side of the through-holes 15C of the second insulator 15 and that the opening portions 17B of the second adhesive sheet 17, the opening portions 22B of the sheet type conductive member 21, and the opening portion s16B of the first adhesive sheet 16 are situated on the −Z direction side of the recessed portions 15D of the second insulator 15.

At this time, the protrusion piece 22C protruding to the inside of the opening portion 22B of the sheet type conductive member 21 faces, through the opening portion 17B of the second adhesive sheet 17, the second projection accommodating portion 13E of the connection portion 13B of the contact 13 inserted in the recessed portion 15D of the second insulator 15.

Further, when the first insulator 14 is pressed against the second insulator 15 from the −Z direction, the first projection 14C of the first insulator 14 is accommodated, through the opening portion 16A of the first adhesive sheet 16, the opening portion 22A of the sheet type conductive member 21, and the opening portion 17A of the second adhesive sheet 17, in the first projection accommodating portion 13D of the contact portion 13A of the contact 13 inserted in the through-hole 15C of the second insulator 15.

In addition, the second projection 14D of the first insulator 14 is accommodated, through the opening portion 16B of the first adhesive sheet 16, the opening portion 22B of the sheet type conductive member 21, and the opening portion 17B of the second adhesive sheet 17, in the second projection accommodating portion 13E of the connection portion 13B of the contact 13 inserted in the recessed portion 15D of the second insulator 15. In this process, the protrusion piece 22C of the sheet type conductive member 21 is pushed and bent in the +Z direction by the second projection 14D of the first insulator 14 and pushed into a portion between the second projection 14D of the first insulator 14 and the second projection accommodating portion 13E of the connection portion 13B of the contact 13.

The first adhesive sheet 16 is sandwiched between the first opposed surface 14B of the first insulator 14 and the bottom surface of the sheet type conductive member 21, while the second adhesive sheet 17 is sandwiched between the second opposed surface 15B of the second insulator 15 and the top surface of the sheet type conductive member 21.

In this manner, the first insulator 14 is pressed, from the −Z direction, against the second insulator 15 in which the plurality of contacts 13 are retained, and a heat treatment is performed in this state, whereby the first adhesive sheet 16 and the second adhesive sheet 17 are melted, so that the first insulator 14 and the second insulator 15 are adhered to the sheet type conductive member 21.

Thus, the assembling operation of the connector 11 and the mounting of the connector 11 on the sheet type conductive member 21 are completed.

Figure 13:
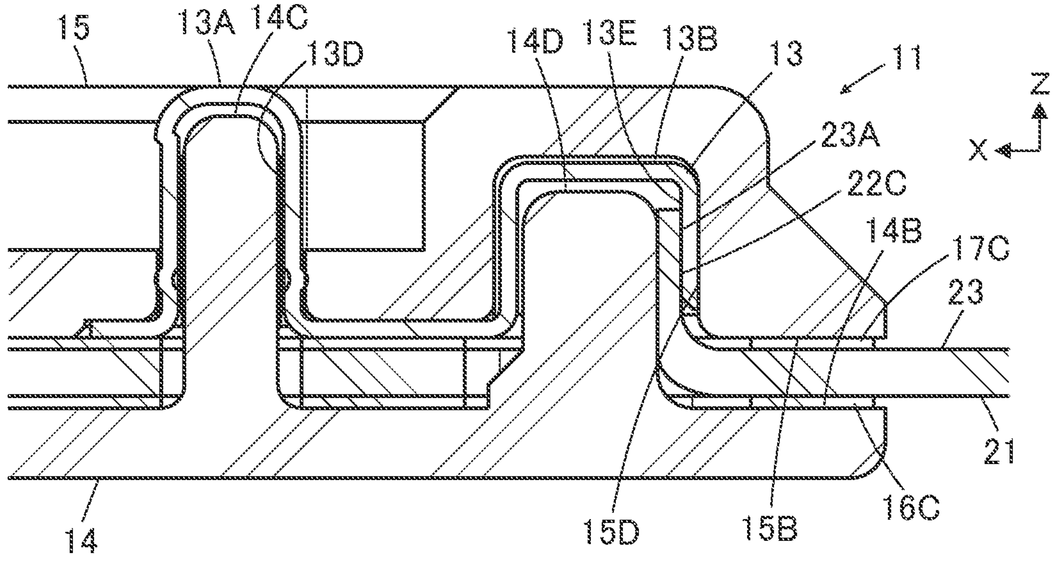
FIG. 13 is a partial cross-sectional view showing the connector according to Embodiment 1 mounted on the sheet type conductive member.

FIG. 13 shows the inside of the connector 11 mounted on the sheet type conductive member 21. The protrusion piece 22C of the sheet type conductive member 21 pushed in the second projection accommodating portion 13E of the connection portion 13B of the contact 13 by the second projection 14D of the first insulator 14 is sandwiched between a lateral surface of the second projection 14D of the first insulator 14 and an inner surface of the second projection accommodating portion 13E of the contact 13. Therefore, the connection end portion 23A of the flexible conductor 23 disposed on the top surface of the protrusion piece 22C makes contact with the inner surface of the second projection accommodating portion 13E with predetermined contact pressure, whereby the contact 13 and the corresponding flexible conductor 23 of the sheet type conductive member 21 are electrically connected to each other.

In addition, the first opposed surface 14B of the first insulator 14 and the bottom surface of the sheet type conductive member 21 are adhered to each other by a first adhesive layer 16C formed by melting the first adhesive sheet 16, and similarly, the second opposed surface 15B of the second insulator 15 and the top surface of the sheet type conductive member 21 are adhered to each other by a second adhesive layer 17C formed by melting the second adhesive sheet 17.

Here, since the two opening portions 16A of the first adhesive sheet 16 shown in FIG. 7 are formed to allow the plurality of first projections 14C, arranged in two rows, of the first insulator 14 to pass therethrough, and the two opening portions 16B are formed to allow the two second projections 14D of the first insulator 14 to pass therethrough, a periphery of the plurality of first projections 14C and a periphery of the two second projections 14D of the first insulator 14 are surrounded by the first adhesive layer 16C.

Similarly, since the two opening portions 17A of the second adhesive sheet 17 shown in FIG. 8 are formed to correspond to the plurality of through-holes 15C, arranged in two rows, of the second insulator 15, and the two opening portions 17B are formed to correspond to the two recessed portions 15D of the second insulator 15, a periphery of the plurality of through-holes 15C and a periphery of the two recessed portions 15D of the second insulator 15 are surrounded by the second adhesive layer 17C.

As a result, water is prevented from passing between the bottom surface of the sheet type conductive member 21 and the first insulator 14 and between the top surface of the sheet type conductive member 21 and the second insulator 15 and entering the connected part between the connection portion 13B of the contact 13 and the flexible conductor 23 of the sheet type conductive member 21.

In this manner, the first adhesive layer 16C constitutes a first waterproof portion that seals between the first opposed surface 14B of the first insulator 14 and the bottom surface of the sheet type conductive member 21, while the second adhesive layer 17C constitutes a second waterproof portion that seals between the second opposed surface 15B of the second insulator 15 and the top surface of the sheet type conductive member 21.

Further, since the first adhesive sheet 16 and the second adhesive sheet 17 are melt to form the first adhesive layer 16C and the second adhesive layer 17C, respectively, even when the sheet body 22 of the sheet type conductive member 21 is formed of cloth or knitted fabric, a melted adhesive penetrates between fibers of the cloth or the knitted fabric, whereby water can be prevented from entering through the inside of the sheet type conductive member 21.

Since the first insulator 14 and the second insulator 15 are elastically deformable members, and the plurality of first projections 14C of the first insulator 14 for retaining the contact portions 13A of the plurality of contacts 13 are independently separate from one another, i.e., disposed away from one another, the connector 11 according to Embodiment 1 can be easily bent both in the X direction and the Y direction. Therefore, even when the connector 11 is mounted on the sheet type conductive member 21 formed of a garment or the like, occurrence of a sense of discomfort and reduction in wear comfort can be suppressed.

Embodiment 2

Figure 14:
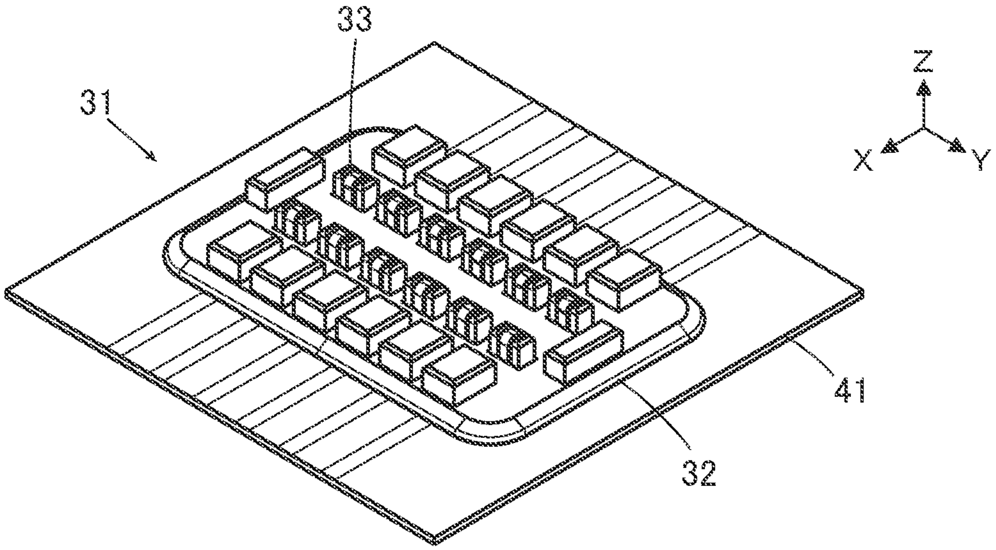
FIG. 14 is a perspective view showing a connector according to Embodiment 2 mounted on a sheet type conductive member.

FIG. 14 shows a connector 31 according to Embodiment 2. As with the connector 11 of Embodiment 1, the connector 31 includes a housing 32 attached to a sheet type conductive member 41 serving as a mounting object, and a plurality of contacts 33 are retained in the housing 32.

The contacts 33 are arranged in two rows parallel to each other and disposed in the housing 32 to project perpendicularly to the sheet type conductive member 41.

Figure 15:
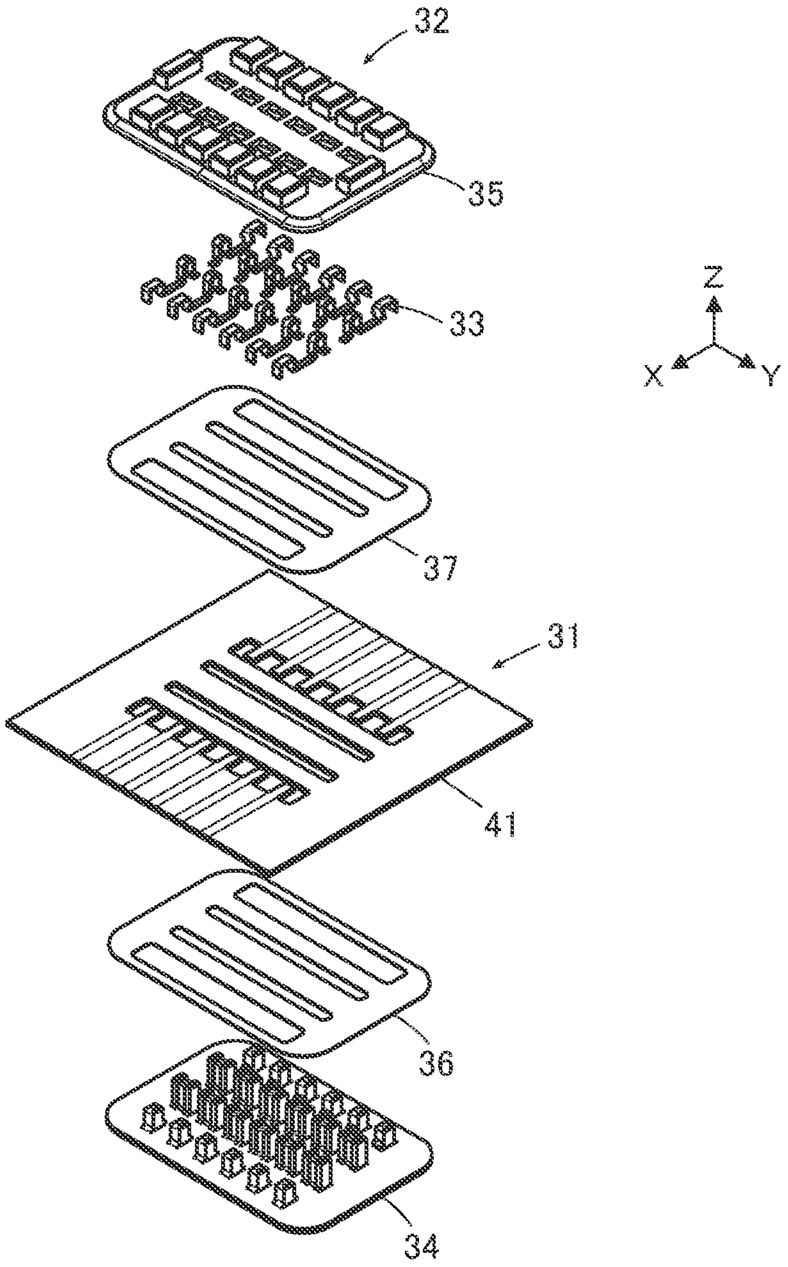
FIG. 15 is an assembly view of the connector according to Embodiment 2.

FIG. 15 shows an assembly view of the connector 31. The connector 31 includes a first insulator 34 and a second insulator 35, and these first and second insulators 34 and 35 constitute the housing 32.

A first adhesive sheet 36 is disposed on the +Z direction side of the first insulator 34, and the sheet type conductive member 41 is disposed on the +Z direction side of the first adhesive sheet 36. Further, a second adhesive sheet 37 is disposed on the +Z direction side of the sheet type conductive member 41, the contacts 33 are disposed on the +Z direction side of the second adhesive sheet 37, and the second insulator 35 is disposed on the +Z direction side of the contacts 33.

Figure 16:
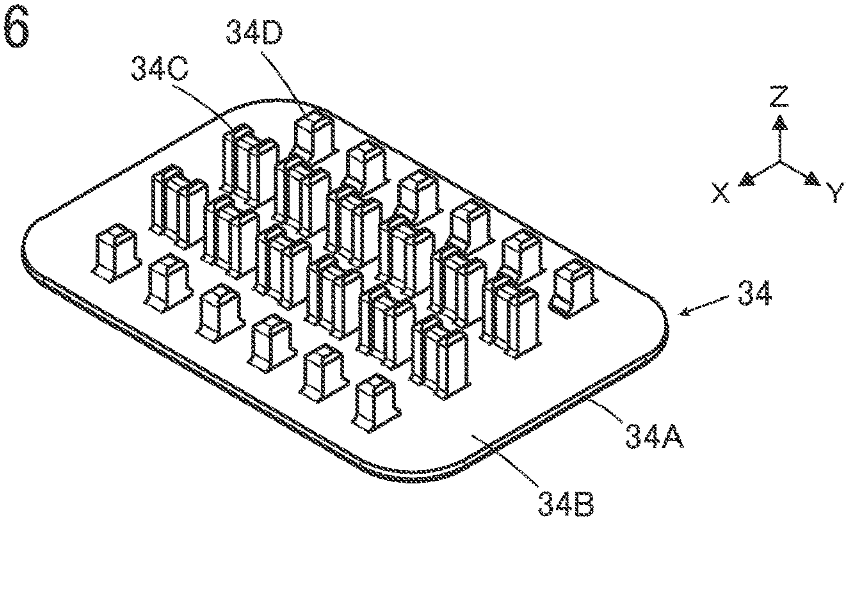
FIG. 16 is a perspective view showing a first insulator used in the connector of Embodiment 2.

The first insulator 34 is an elastically deformable member made of an insulating material and includes a flat plate portion 34A of substantially rectangular shape extending along an XY plane as shown in FIG. 16, and a +Z directional surface of the flat plate portion 34A forms a first opposed surface 34B facing the bottom surface of the sheet type conductive member 41.

The first insulator 34 includes a plurality of the first projections 34C projecting in the +Z direction from the first opposed surface 34B. The first projections 34C are arranged in two rows extending in the Y direction and spaced apart from each other in the X direction.

Further, the first insulator 34 includes a plurality of the second projections 34D corresponding to the plurality of first projections 34C and projecting in the +Z direction from the first opposed surface 34B. The plurality of second projections 34D are separated on the +X direction side and the −X direction side of the plurality of first projections 34C and arranged in two rows extending in the Y direction.

The first projection 34C has a projection height higher in the Z direction than that of the second projection 34D.

Figure 17:
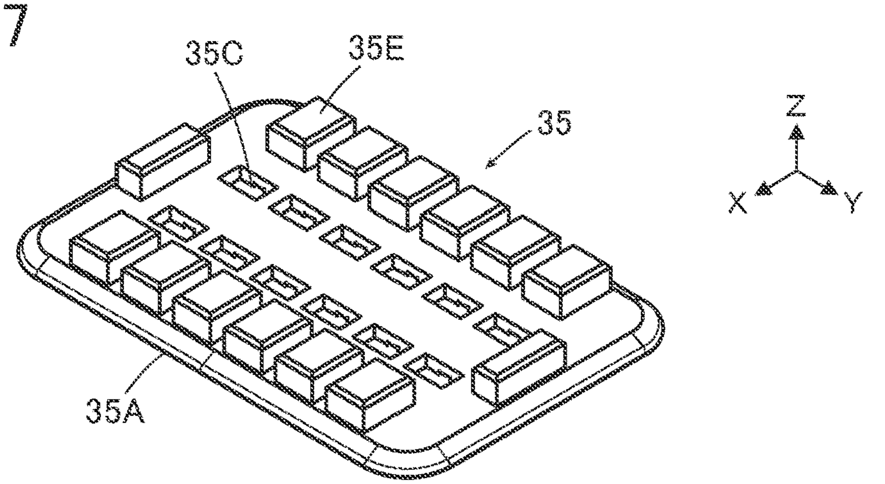
FIG. 17 is a perspective view of a second insulator used in the connector of Embodiment 2 when viewed from an obliquely upper position.
Figure 18:
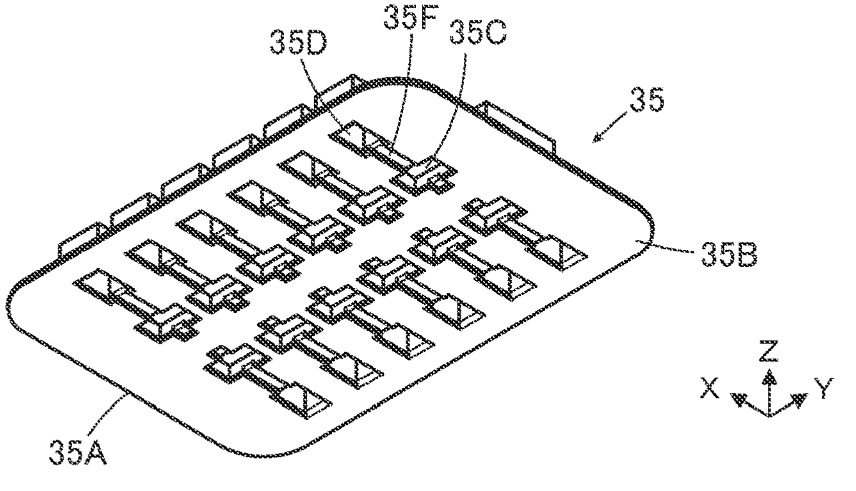
FIG. 18 is a perspective view of the second insulator used in the connector of Embodiment 2 when viewed from an obliquely lower position.

As with the first insulator 34, the second insulator 35 is also an elastically deformable member made of an insulating material. As shown in FIGS. 17 and 18, the second insulator 35 includes a flat plate portion 35A of substantially rectangular shape extending along an XY plane, and the bottom surface on the −Z direction side of the flat plate portion 35A forms a second opposed surface 35B facing the top surface of the sheet type conductive member 41.

The second insulator 35 includes a plurality of through-holes 35C corresponding to the plurality of first projections 34C of the first insulator 34 and penetrating the flat plate portion 35A in the Z direction, and a plurality of recessed portions 35D corresponding to the plurality of second projections 34D of the first insulator 34 and recessed in the +Z direction from the second opposed surface 35B.

The plurality of through-holes 35C and the plurality of recessed portions 35D are respectively disposed at positions corresponding to the plurality of first projections 34C and the plurality of second projections 34D of the first insulator 34.

As shown in FIG. 17, a +X directional edge and a −X directional edge of the flat plate portion 35A are provided with a plurality of protrusion portions 35E arranged along the Y direction and protruding in the +Z direction, and the plurality of recessed portions 35D are formed inside the plurality of protrusion portions 35E.

Further, as shown in FIG. 18, the second opposed surface 35B is provided with a plurality of grooves 35F each of which allow the through-hole 35C and the recessed portion 35D, which correspond to each other, to communicate with each other. Each groove 35F extends in the X direction.

Figure 19:
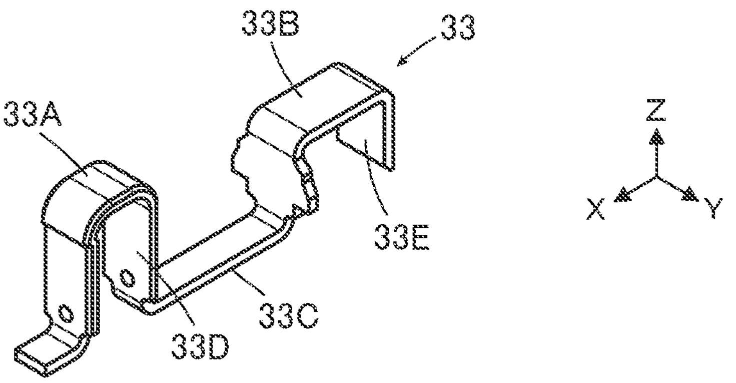
FIG. 19 is a perspective view showing a contact used in the connector of Embodiment 2.

As shown in FIG. 19, as with the contact 13 in Embodiment 1, the contact 33 is constituted of a band-shaped member made of a conductive member such as metal, and includes a contact portion 33A and a connection portion 33B that are disposed with a distance therebetween in the X direction, and a joint portion 33C that joins these contact portion 33A and connection portion 33B to each other.

The contact portion 33A has a projection shape projecting in the +Z direction and is provided in its inside with a first projection accommodating portion 33D of recess shape opening toward the −Z direction.

The connection portion 33B also has a projection shape projecting in the +Z direction and is provided in its inside with a second projection accommodating portion 33E of recess shape opening toward the −Z direction.

The joint portion 33C extends along an XY plane.

Figure 20:
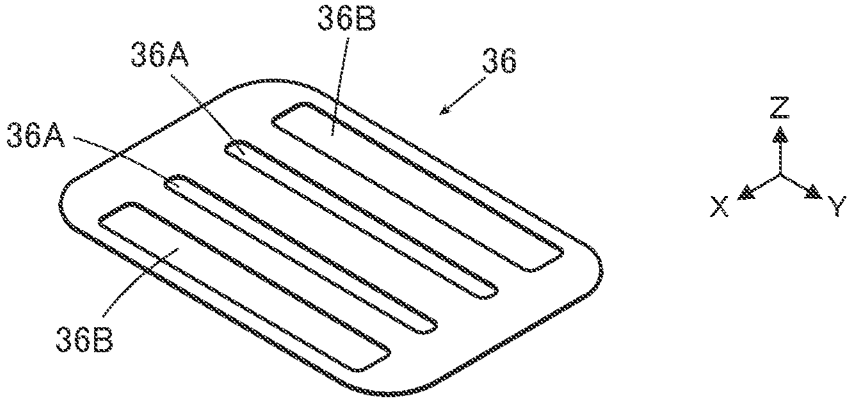
FIG. 20 is a perspective view showing a first adhesive sheet used in the connector of Embodiment 2.

As shown in FIG. 20, the first adhesive sheet 36 has a rectangular outer shape corresponding to the flat plate portion 34A of the first insulator 34 and includes two opening portions 36A that allow the plurality of first projections 34C arranged in two rows to pass therethrough and two opening portions 36B that allow the plurality of second projections 34D arranged in two rows to pass therethrough.

Figure 21:
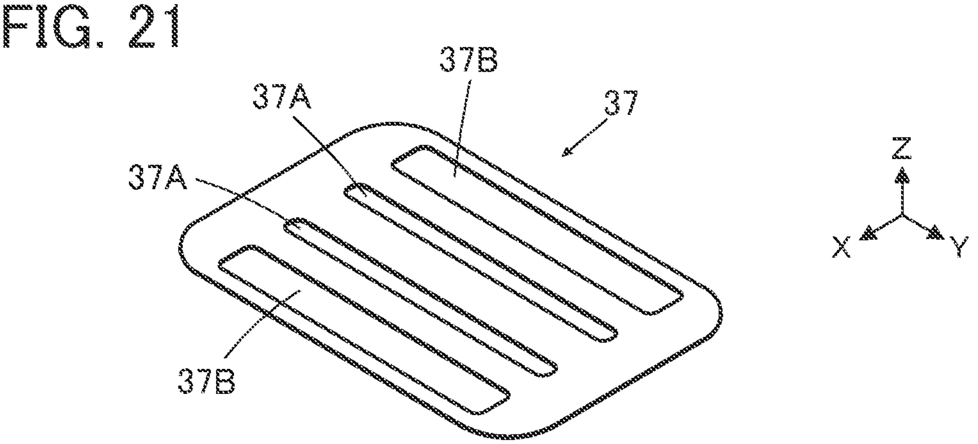
FIG. 21 is a perspective view showing a second adhesive sheet used in the connector of Embodiment 2.

As shown in FIG. 21, the second adhesive sheet 37 has a rectangular outer shape corresponding to the flat plate portion 35A of the second insulator 35 and includes two opening portions 37A corresponding to the plurality of through-holes 35C arranged in two rows and the two opening portions 37B corresponding to the plurality of recessed portions 35D arranged in two rows.

As the first adhesive sheet 36 and the second adhesive sheet 37, thermosetting adhesive sheets can be used, for example.

Figure 22:
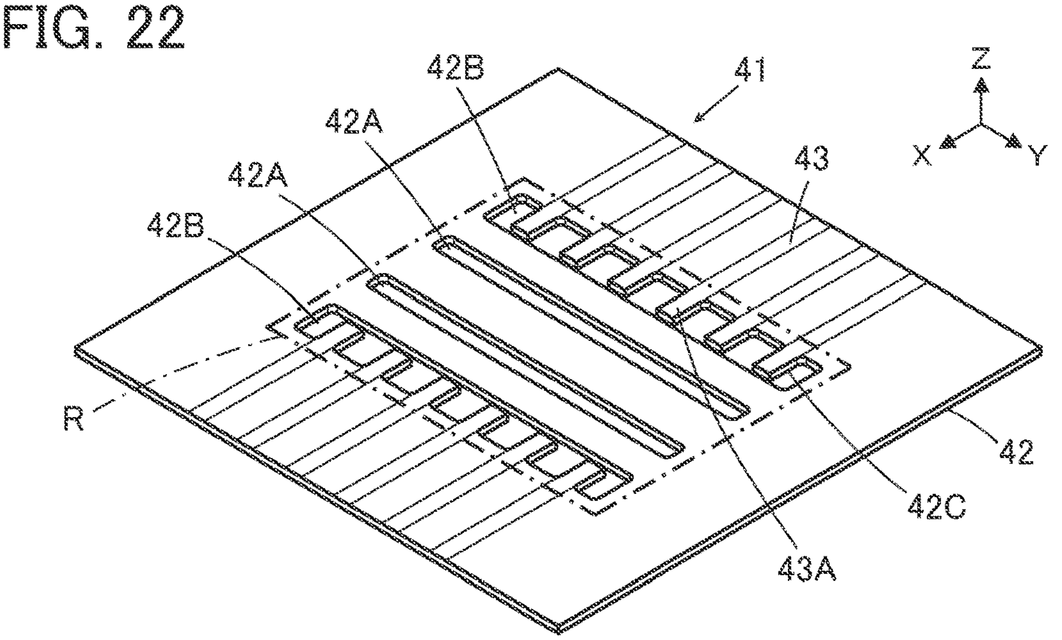
FIG. 22 is a perspective view showing the sheet type conductive member on which the connector of Embodiment 2 is to be mounted.

FIG. 22 shows the configuration of the sheet type conductive member 41. The sheet type conductive member 41 includes an insulating sheet body 42 and a plurality of flexible conductors 43 retained in the sheet body 42 and exposed at least on the top surface of the sheet body 42.

A mounting region R on which the connector 31 is to be mounted is defined on the sheet body 42, and two opening portions 42A that allow the plurality of first projections 34C, arranged in two rows, of the first insulator 34 to pass therethrough and two opening portions 42B that allow the plurality of second projections 34D, arranged in two rows, of the first insulator 34 to pass therethrough are formed in the mounting region R. The opening portions 42B are disposed separately on the +X direction and the −X direction side of the two opening portions 42A. Each opening portion 42B is provided with a plurality of protrusion pieces 42C constituted of part of the sheet body 42 and protruding in the X direction from an edge opposite from the corresponding opening portion 42A toward the corresponding opening portion 42A.

The sheet type conductive member 41 includes a plurality of flexible conductors 43 disposed on the +X direction side of the mounting region R and a plurality of flexible conductors 43 disposed on the −X direction side of the mounting region R. Each flexible conductor 43 includes a connection end portion 43A extending in the X direction from the outside of the mounting region R and disposed on the corresponding protrusion piece 42C in the mounting region R.

Figure 23:
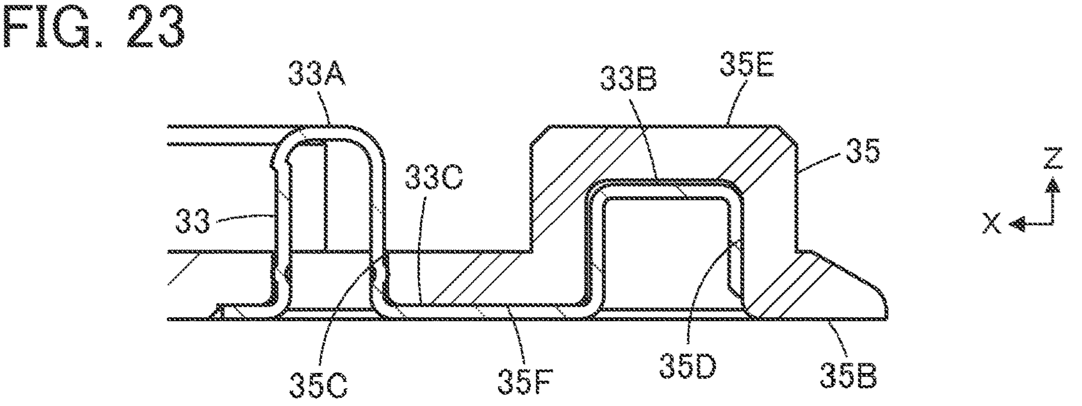
FIG. 23 is a partial cross-sectional view showing the second insulator in which the contact is retained in Embodiment 2.

In the process of assembling the connector 31, first, the contact 33 is pushed into the second insulator 35 from the −Z direction, whereby the contact 33 is retained in the second insulator 35 as shown in FIG. 23. At this time, the contact portion 33A of the contact 33 is passed through the corresponding through-hole 35C of the second insulator 35 and projects in the +Z direction. In addition, the connection portion 33B of the contact 33 is inserted into the corresponding recessed portion 35D of the second insulator 35, and the joint portion 33C of the contact 33 is inserted into the corresponding groove 35F of the second insulator 35.

Figure 24:
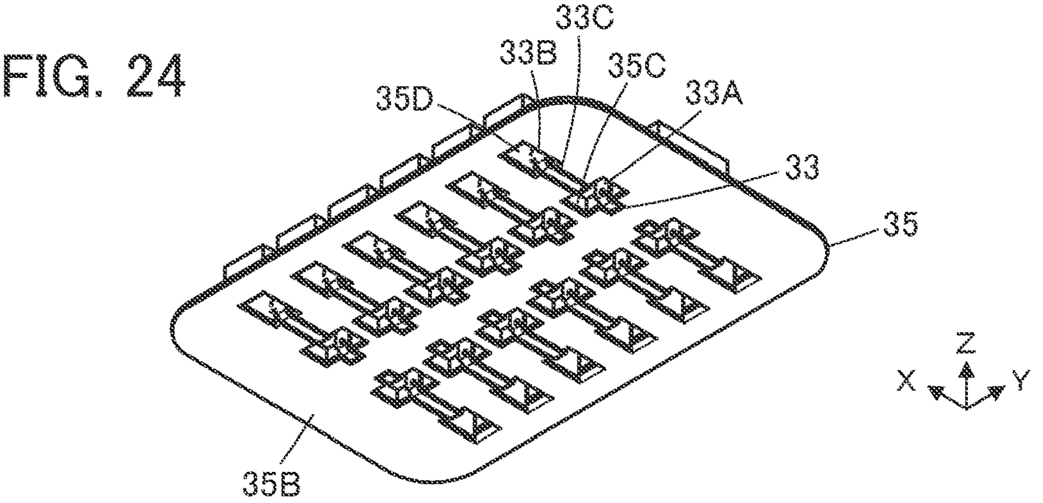
FIG. 24 is a perspective view of the second insulator in which a plurality of contacts are retained in Embodiment 2 when viewed from an obliquely lower position.

Similarly, as shown in FIG. 24, the plurality of contacts 33 are retained in the second insulator 35.

Figure 25:
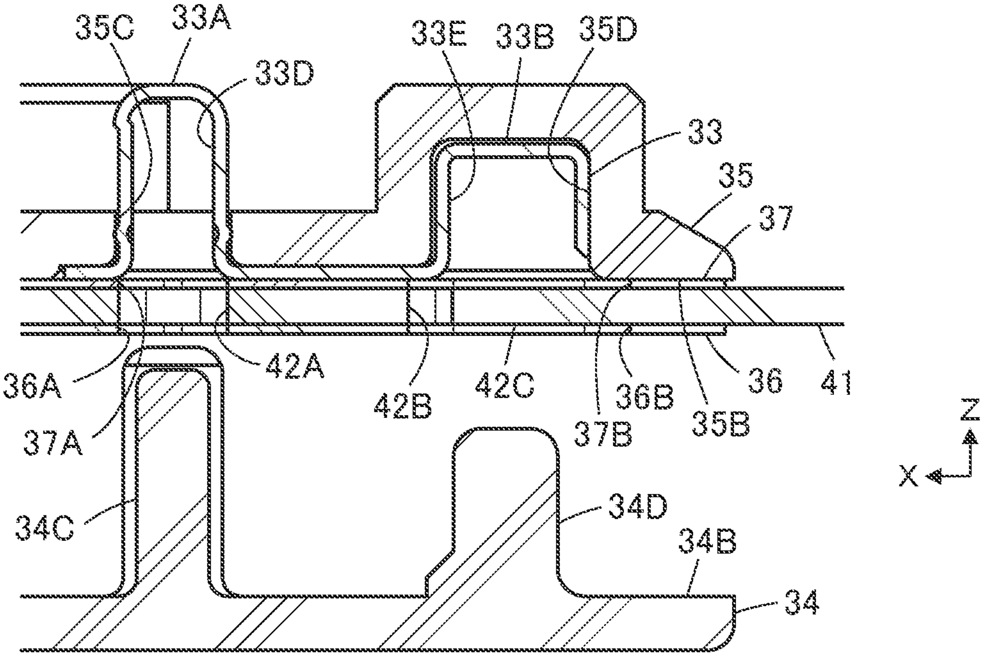
FIG. 25 is a partial cross-sectional view showing the first insulator and the second insulator in the process of assembling in Embodiment 2.

Next, as shown in FIG. 25, the second adhesive sheet 37, the sheet type conductive member 41, and the first adhesive sheet 36 are sequentially superposed and disposed on the second opposed surface 35B, facing in the −Z direction, of the second insulator 35.

The second adhesive sheet 37, the sheet type conductive member 41, and the first adhesive sheet 36 are positioned with respect to the second insulator 35 such that the opening portions 37A of the second adhesive sheet 37, the opening portions 42A of the sheet type conductive member 41, and the opening portions 36A of the first adhesive sheet 36 are situated on the −Z direction side of the through-holes 35C of the second insulator 35 and that the opening portions 37B of the second adhesive sheet 37, the opening portions 42B of the sheet type conductive member 41, and the opening portions 36B of the first adhesive sheet 36 are situated on the −Z direction side of the recessed portions 35D of the second insulator 35.

At this time, the protrusion piece 42C protruding in the opening portion 42B of the sheet type conductive member 41 faces, through the opening portion 37B of the second adhesive sheet 37, the second projection accommodating portion 33E of the connection portion 33B of the contact 33 inserted in the recessed portion 35D of the second insulator 35.

Further, when the first insulator 34 is pressed against the second insulator 35 from the −Z direction, the first projection 34C of the first insulator 34 is accommodated, through the opening portion 36A of the first adhesive sheet 36, the opening portion 42A of the sheet type conductive member 41, and the opening portion 37A of the second adhesive sheet 37, in the first projection accommodating portion 33D of the contact portion 33A of the contact 33 inserted in the through-hole 35C of the second insulator 35.

In addition, the second projection 34D of the first insulator 34 is accommodated, through the opening portion 36B of the first adhesive sheet 36, the opening portion 42B of the sheet type conductive member 41, and the opening portion 37B of the second adhesive sheet 37, in the second projection accommodating portion 33E of the connection portion 33B of the contact 33 inserted in the recessed portion 35D of the second insulator 35. In this process, the protrusion piece 42C of the sheet type conductive member 41 is pushed and bent in the +Z direction by the second projection 34D of the first insulator 34 and pushed into a portion between the second projection 34D of the first insulator 34 and the second projection accommodating portion 33E of the connection portion 33B of the contact 33.

The first adhesive sheet 36 is sandwiched between the first opposed surface 34B of the first insulator 34 and the bottom surface of the sheet type conductive member 41, while the second adhesive sheet 37 is sandwiched between the second opposed surface 35B of the second insulator 35 and the top surface of the sheet type conductive member 41.

In this manner, the first insulator 34 is pressed, from the −Z direction, against the second insulator 35 in which the plurality of contacts 33 are retained, and a heat treatment is performed in this state, whereby the first adhesive sheet 36 and the second adhesive sheet 37 are melted, so that the first insulator 34 and the second insulator 35 are adhered to the sheet type conductive member 41.

Thus, the assembling operation of the connector 31 and the mounting of the connector 31 on the sheet type conductive member 41 are completed.

Figure 26:
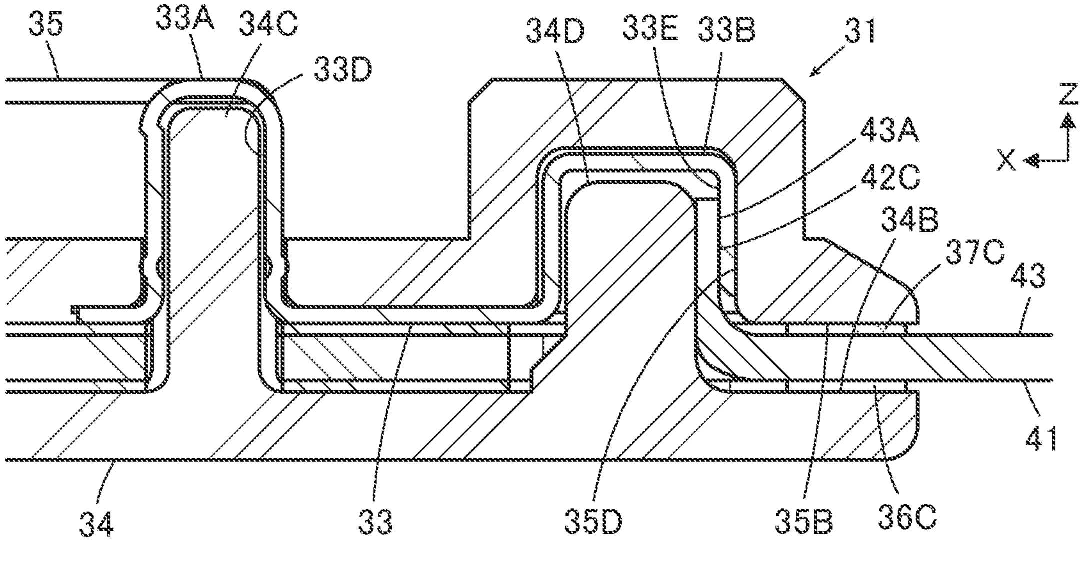
FIG. 26 is a partial cross-sectional view showing the connector according to Embodiment 2 mounted on the sheet type conductive member.

FIG. 26 shows the inside of the connector 31 mounted on the sheet type conductive member 41. The protrusion piece 42C of the sheet type conductive member 41 pushed in the second projection accommodating portion 33E of the connection portion 33B of the contact 33 by the second projection 34D of the first insulator 34 is sandwiched between a lateral surface of the second projection 34D of the first insulator 34 and an inner surface of the second projection accommodating portion 33E of the contact 33. Therefore, the connection end portion 43A of the flexible conductor 43 disposed on the top surface of the protrusion piece 42C makes contact with the inner surface of the second projection accommodating portion 33E with predetermined contact pressure, whereby the contact 33 and the corresponding flexible conductor 43 of the sheet type conductive member 41 are electrically connected to each other.

In addition, the first opposed surface 34B of the first insulator 34 and the bottom surface of the sheet type conductive member 41 are adhered to each other by a first adhesive layer 36C formed by melting the first adhesive sheet 36, and similarly, the second opposed surface 35B of the second insulator 35 and the top surface of the sheet type conductive member 41 are adhered to each other by a second adhesive layer 37C formed by melting the second adhesive sheet 37.

Here, since the two opening portions 36A of the first adhesive sheet 36 shown in FIG. 20 are formed to allow the plurality of first projections 34C, arranged in two rows, of the first insulator 34 to pass therethrough, and the two opening portions 36B are formed to allow the plurality second projections 34D, arranged in two rows, of the first insulator 34 to pass therethrough, a periphery of the plurality of first projections 34C and a periphery of the plurality of second projections 34D of the first insulator 34 are surrounded by the first adhesive layer 36C.

Similarly, since the two opening portions 37A of the second adhesive sheet 37 shown in FIG. 21 are formed to correspond to the plurality of through-holes 35C, arranged in two rows, of the second insulator 35, and the two opening portions 37B are formed to correspond to the plurality of recessed portions 35D, arranged in two rows, of the second insulator 35, a periphery of the plurality of through-holes 35C and a periphery of the plurality of recessed portions 35D of the second insulator 35 are surrounded by the second adhesive layer 37C.

As a result, water is prevented from passing between the bottom surface of the sheet type conductive member 41 and the first insulator 34 and between the top surface of the sheet type conductive member 41 and the second insulator 35 and entering the connected part between the connection portion 33B of the contact 33 and the flexible conductor 43 of the sheet type conductive member 41.

In this manner, the first adhesive layer 36C constitutes a first waterproof portion that seals between the first opposed surface 34B of the first insulator 34 and the bottom surface of the sheet type conductive member 41, while the second adhesive layer 37C constitutes a second waterproof portion that seals between the second opposed surface 35B of the second insulator 35 and the top surface of the sheet type conductive member 41.

In the connector 31 according to Embodiment 2, as with the connector 11 according to Embodiment 1, the first insulator 34 and the second insulator 35 are elastically deformable members, and not only the plurality of first projections 34C of the first insulator 34 for retaining the contact portions 33A of the plurality of contacts 33 but also the plurality of second projections 34D of the first insulator 34 accommodated in the second projection accommodating portions 33E of the connection portions 33B of the plurality of contacts 33 are independently separate from one another. Therefore, the connector 31 of Embodiment 2 has more excellent flexibility than that of the connector 11 of Embodiment 1 and can be bent quite easily both in the X direction and the Y direction.

Therefore, even when the connector 31 is mounted on the sheet type conductive member 41 formed of a garment or the like, occurrence of a sense of discomfort and reduction in wear comfort can be prevented.

Figure 27:
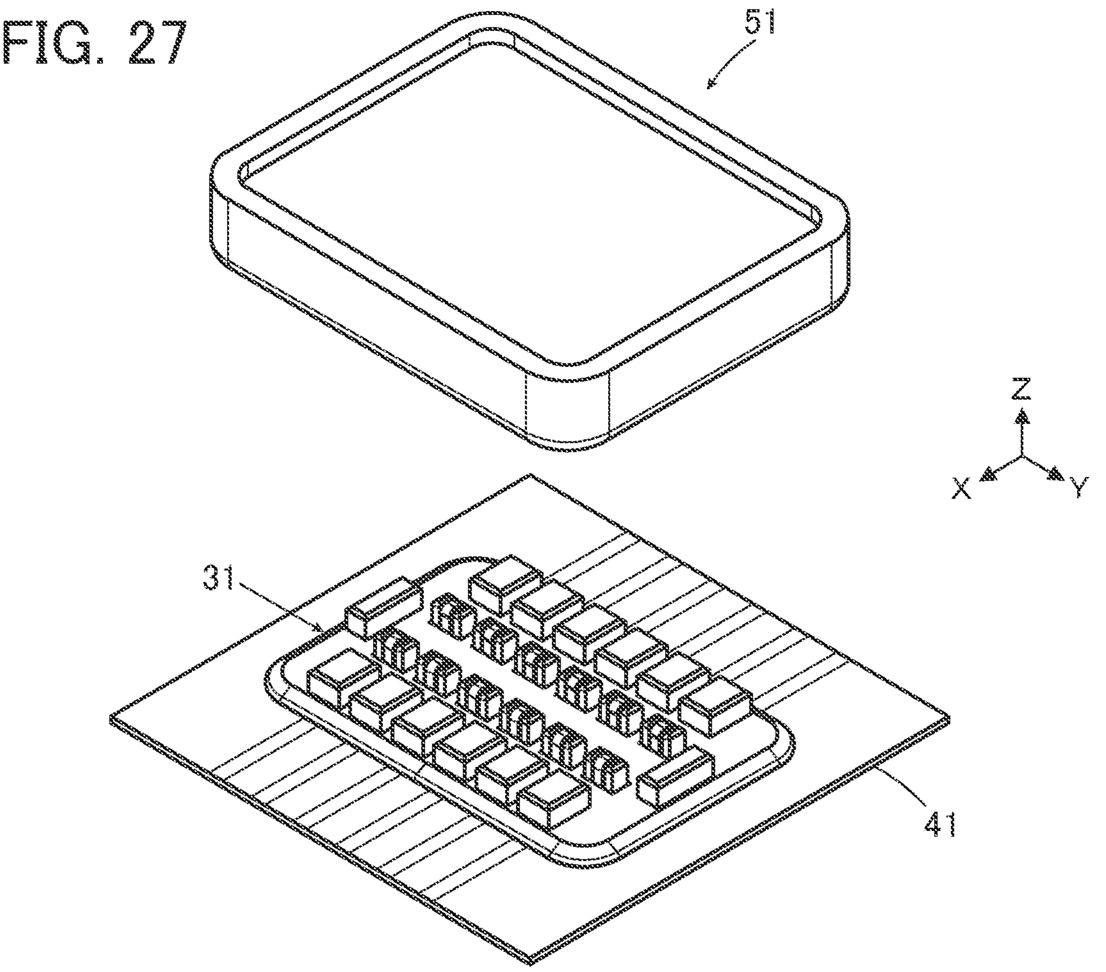
FIG. 27 is a perspective view showing a state where a counter connector is positioned with respect to the connector according to Embodiment 2.

As shown in FIG. 27, a counter connector 51 is positioned with respect to the connector 31 mounted on the sheet type conductive member 41, and the counter connector 51 is moved relatively in the −Z direction and pressed against the connector 31, whereby the counter connector 51 can be fitted to the connector 31.

Figure 28:
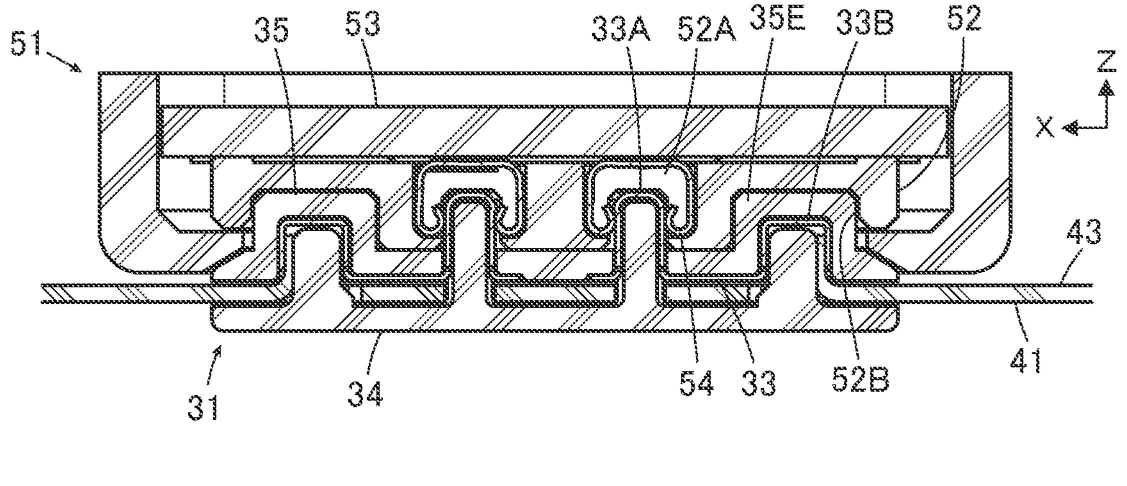
FIG. 28 is a cross-sectional view showing a state where the counter connector is fitted with the connector according to Embodiment 2.

FIG. 28 shows a cross-sectional view of the connector 31 and the counter connector 51 in the fitted state. The counter connector 51 includes a housing 52, and the housing 52 is provided with a plurality of contact accommodating portions 52A of recess shape and a plurality of protrusion portion accommodating portions 52B of recess shape. A substrate 53 is disposed in the housing 52, and a plurality of counter contacts 54 retained in the substrate 53 are disposed in the plurality of contact accommodating portions 52A.

When the connector 31 and the counter connector 51 are fitted with each other, the contact portions 33A of the plurality of contacts 33 of the connector 31 are inserted into the plurality of contact accommodating portions 52A of the housing 52 of the counter connector 51, and the plurality of protrusion portions 35E of the second insulator 35 of the connector 31 are accommodated in the plurality of protrusion portion accommodating portions 52B of the housing 52 of the counter connector 51.

The contact portion 33A of the contact 33 of the connector 31 inserted in the contact accommodating portion 52A of the counter connector 51 makes contact with the counter contact 54 disposed in the contact accommodating portion 52A.

Similarly, the contact portions 33A of the plurality of contacts 33 of the connector 31 make contact with the plurality of counter contacts 54 of the counter connector 51.

As a result, the plurality of counter contacts 54 of the counter connector 51 can be electrically connected separately to the plurality of flexible conductors 43 of the sheet type conductive member 41 via the plurality of contacts 33 of the connector 31.

For example, the sheet type conductive member 41 is constituted of a garment, and when end portions of the plurality of flexible conductors 43 are connected to electrodes (not shown) attached to the garment, and a predetermined electronic circuit is mounted on the substrate 53 of the counter connector 51, biological data obtained via the electrodes can be measured by the electronic circuit or transmitted from the electronic circuit to a remote measurement device.

Similarly, a counter connector can be fitted to the connector 11 of Embodiment 1 to measure biological data.

Embodiment 3

In Embodiment 2 above, the first adhesive sheet 36 and the second adhesive sheet 37 are melt to form the first adhesive layer 36C and the second adhesive layer 37C, respectively, thereby waterproofing the connector 31, but the invention is not limited thereto.

Figure 29:
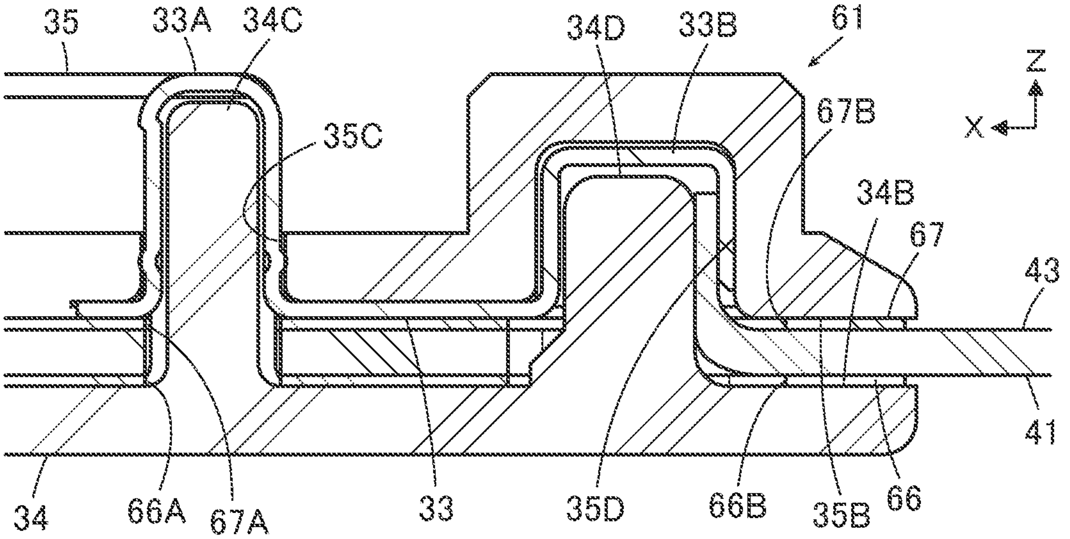
FIG. 29 is a partial cross-sectional view showing a connector according to Embodiment 3 mounted on the sheet type conductive member.
Figure 30:
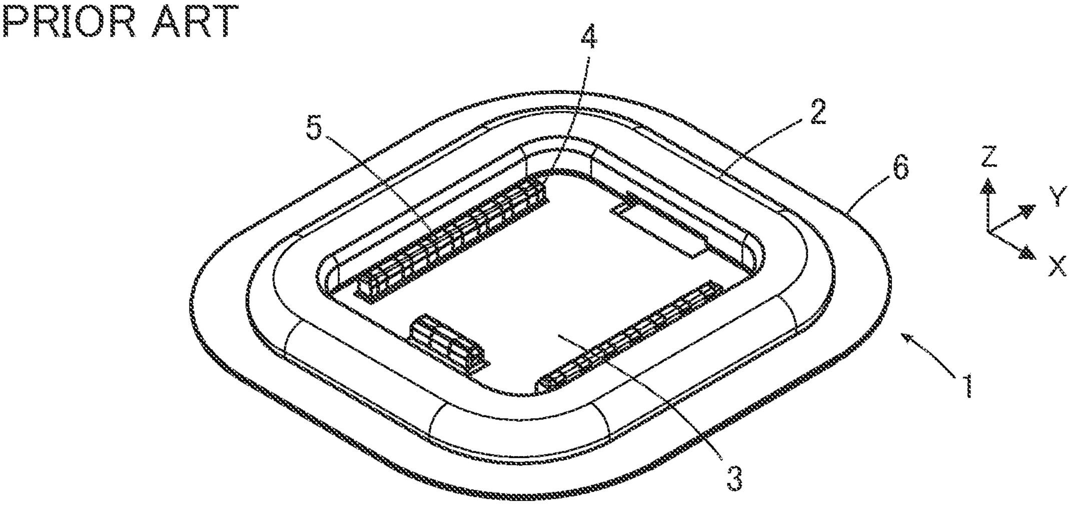
FIG. 30 PRIOR ART
FIG. 30 is a perspective view showing a conventional connector.

FIG. 29 shows the inside of a connector 61 according to Embodiment 3. The connector 61 is configured to use a first waterproof sheet 66 and a second waterproof sheet 67 in place of the first adhesive layer 36C and the second adhesive layer 37C in the connector 31 according to Embodiment 2, and otherwise has the same configuration as the connector 31 of Embodiment 2.

The first waterproof sheet 66 and the second waterproof sheet 67 are each made of a rubber, resin or the like.

As with the first adhesive sheet 36 in Embodiment 2 shown in FIG. 20, the first waterproof sheet 66 includes two opening portions 66A that allow the plurality of first projections 34C, arranged in two rows, of the first insulator 34 to pass therethrough and two opening portions 66B that allow the plurality of second projections 34D, arranged in two rows, of the first insulator 34 to pass therethrough.

As with the second adhesive sheet 37 in Embodiment 2 shown in FIG. 21, the second waterproof sheet 67 includes two opening portions 67A corresponding to the plurality of through-holes 35C, arranged in two rows, of the second insulator 35 and two opening portions 67B corresponding to the plurality of recessed portions 35D, arranged in two rows, of the second insulator 35.

The first insulator 34 and the second insulator 35 are fixed with each other by a fixing mechanism (not shown). For example, a plurality of bosses formed on one of the first insulator 34 and the second insulator 35 are passed through a plurality of through-holes formed in the other of the first insulator 34 and the second insulator 35, and tips of the plurality of bosses projecting from the plurality of through-holes are heated and deformed, whereby the first insulator 34 and the second insulator 35 can be fixed with each other with a compression force in the Z direction acting on the first waterproof sheet 66, the second waterproof sheet 67, and the sheet type conductive member 41.

Even when the connector 61 is assembled by using the first waterproof sheet 66 and the second waterproof sheet 67 as above, water can be prevented from passing between the first opposed surface 34B of the first insulator 34 and the bottom surface of the sheet type conductive sheet 41 and between the second opposed surface 35B of the second insulator 35 and the top surface of the sheet type conductive member 41 and entering the connected part between the connection portion 33B of the contact 33 and the flexible conductor 43 of the sheet type conductive member 41.

In this manner, the first waterproof sheet 66 constitutes a first waterproof portion that seals between the first opposed surface 34B of the first insulator 34 and the bottom surface of the sheet type conductive member 41, while the second waterproof sheet 67 constitutes a second waterproof portion that seals between the second opposed surface 35B of the second insulator 35 and the top surface of the sheet type conductive member 41.

In particular, when a so-called flexible substrate, in which the flexible conductor 43 constituted of a conductive layer is disposed on the top surface of the sheet body 42 formed of a resin film, is used as the sheet type conductive member 41, there is less possibility of water entering through the inside of the sheet type conductive member 41, so that the connector 61 of Embodiment 3 using the first waterproof sheet 66 and the second waterproof sheet 67 can be effectively applied.

While, in Embodiments 1 to 3 described above, the plurality of contacts 13, 33 are arranged in two rows parallel to each other, the invention is not limited thereto, and the contacts 13, 33 may be arranged in one row.

While, in Embodiments 1 to 3 described above, the connector 11, 31, 61 is mounted on the sheet type conductive member 21, 41 formed of part of a garment as a sheet type mounting object, the mounting object is not limited to a garment. The connector according to this invention can be mounted on, for example, a bag that the user carries or wears without feeling discomfort, and also on a sheet, a bed or a bedding piece on or in which the user lies without causing reduction in coziness.

What is claimed is:

1. A connector that is mounted on a mounting object of sheet type having a plurality of flexible conductors exposed on a surface of the mounting object and that is to be fitted with a counter connector in a fitting direction, the connector comprising:

a housing that is made of an insulating material and is bendable; and a plurality of contacts retained in the housing with arranged in an arrangement direction orthogonal to the fitting direction, each of the plurality of contacts being made of a conductive material, wherein the housing includes a plurality of first projections arranged in the arrangement direction to correspond to the plurality of contacts and projecting in the fitting direction, each of the plurality of contacts includes a contact portion retained in a corresponding one of the plurality of first projections and configured to make contact with a corresponding counter contact of the counter connector, the contact portion has a projection shape projecting in the fitting direction and includes a first projection accommodating portion of recess shape in which the corresponding one of the plurality of first projections is inserted, a connection portion connected to a corresponding one of the plurality of flexible conductors of the mounting object, and a joint portion that joins the contact portion and the connection portion to each other, and the plurality of first projections are separate from one another.

2. The connector according to claim 1, wherein the housing includes a first insulator that has a first opposed surface facing a bottom surface of the mounting object and the plurality of first projections formed to project on the first opposed surface, and a second insulator that has a second opposed surface facing a top surface of the mounting object and a plurality of through-holes through which the plurality of first projections are passed, the mounting object has an opening portion and is disposed to be sandwiched between the first opposed surface and the second opposed surface, and the plurality of first projections are passed through the opening portion of the mounting object and the plurality of through-holes of the second insulator to project in the fitting direction.

3. The connector according to claim 2, wherein the first insulator includes a second projection projecting in the fitting direction from the first opposed surface, the connection portion of each of the plurality of contacts includes a second projection accommodating portion of recess shape in which the second projection is inserted, the second insulator includes a recessed portion corresponding to the second projection and recessed in the fitting direction from the second opposed surface, and the connection portion of each of the plurality of contacts is inserted in the recessed portion of the second insulator, part of the mounting object is sandwiched between an inner surface of the second projection accommodating portion and a lateral surface of the second projection in a direction orthogonal to the fitting direction and the arrangement direction, and the inner surface of the second projection accommodating portion makes contact with the top surface of the mounting object, whereby each of the plurality of contacts is connected to a corresponding one of the plurality of flexible conductors of the mounting object.

4. The connector according to claim 3, comprising a first waterproof portion that seals between the bottom surface of the mounting object and the first opposed surface, and a second waterproof portion that seals between the top surface of the mounting object and the second opposed surface.

5. The connector according to claim 4, wherein the first waterproof portion continuously surrounds a periphery of the plurality of first projections and a periphery of the second projection, and the second waterproof portion continuously surrounds a periphery of the plurality of through-holes and a periphery of the recessed portion.

6. The connector according to claim 2, wherein the first insulator includes a plurality of second projections corresponding to the plurality of contacts and projecting in the fitting direction from the first opposed surface, the connection portion of each of the plurality of contacts includes a second projection accommodating portion of recess shape in which a corresponding one of the plurality of second projections is inserted, the second insulator includes a plurality of recessed portions corresponding to the plurality of second projections and recessed in the fitting direction from the second opposed surface, the connection portion of each of the plurality of contacts is inserted in a corresponding one of the plurality of recessed portions of the second insulator, part of the mounting object is sandwiched between an inner surface of the second projection accommodating portion and a lateral surface of a corresponding one of the plurality of second projections in a direction orthogonal to the fitting direction and the arrangement direction, and the inner surface of the second projection accommodating portion makes contact with the top surface of the mounting object, whereby each of the plurality of contacts is connected to the corresponding one of the plurality of flexible conductors of the mounting object, and the plurality of second projections are separate from one another.

7. The connector according to claim 6, comprising a first waterproof portion that seals between the bottom surface of the mounting object and the first opposed surface, and a second waterproof portion that seals between the top surface of the mounting object and the second opposed surface.

8. The connector according to claim 7, wherein the first waterproof portion continuously surrounds a periphery of the plurality of first projections and a periphery of the plurality of second projections, and the second waterproof portion continuously surrounds a periphery of the plurality of through-holes and a periphery of the plurality of recessed portions.

9. The connector according to claim 3, wherein each of the plurality of first projections has a projection height higher than that of the second projection.

10. The connector according to claim 4, wherein the first waterproof portion is constituted of a first adhesive layer that adheres the bottom surface of the mounting object to the first opposed surface, and the second waterproof portion is constituted of a second adhesive layer that adheres the top surface of the mounting object to the second opposed surface.

11. The connector according to claim 4, wherein the first waterproof portion is constituted of a first waterproof sheet that is sandwiched between the bottom surface of the mounting object and the first opposed surface, and the second waterproof portion is constituted of a second waterproof sheet that is sandwiched between the top surface of the mounting object and the second opposed surface.

* * * * *